Patented Feb. 12, 1924.

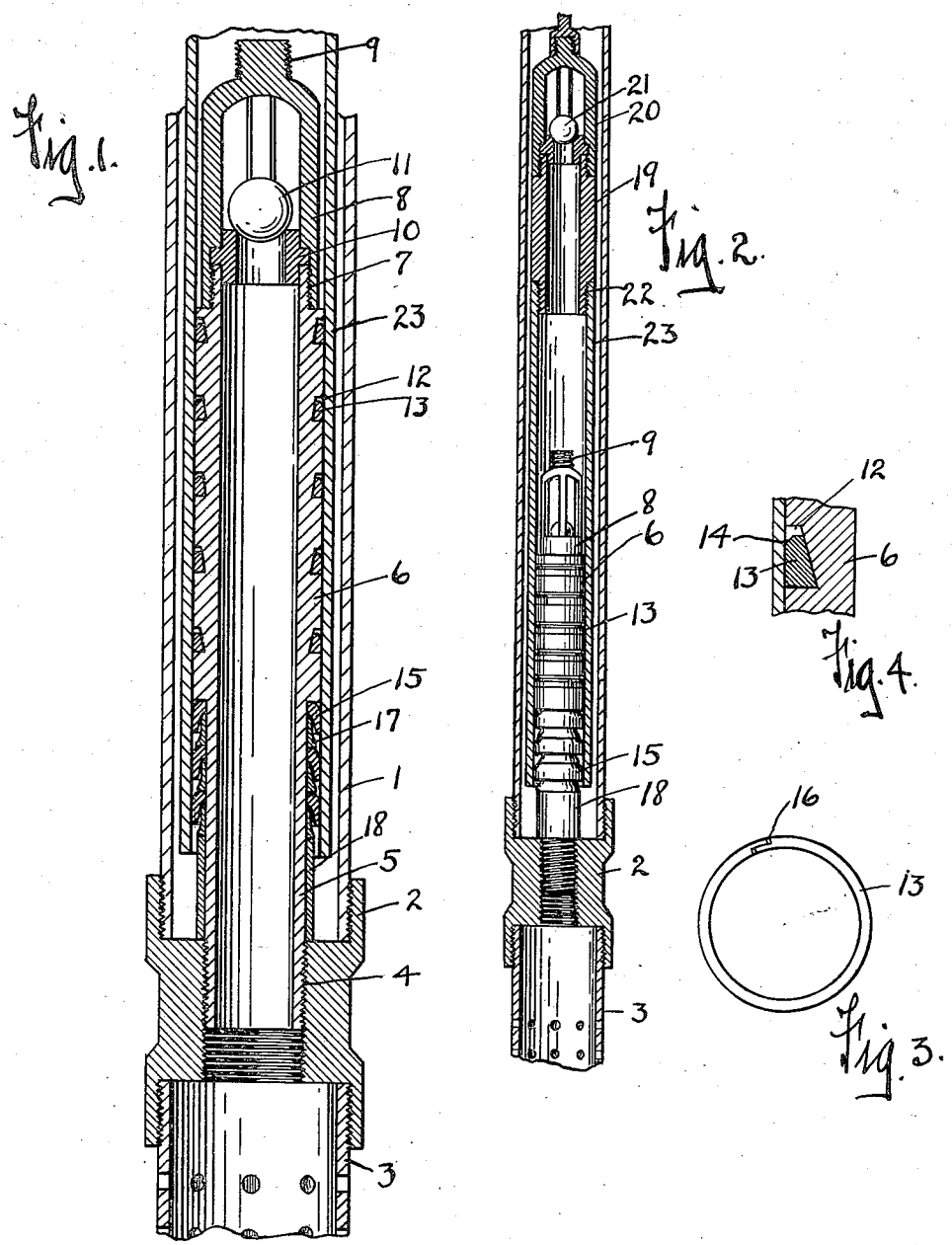

1,483,370

UNITED STATES PATENT OFFICE.

FRANK J. MILLER, OF WICHITA FALLS, TEXAS, ASSIGNOR, BY MESNE ASSIGNMENTS, TO L. E. TROUT, OF OKLAHOMA CITY, OKLAHOMA.

PUMP.

Application filed April 6, 1923. Serial No. 630,223.

*To all whom it may concern:*

Be it known that I, FRANK J. MILLER, a citizen of the United States, residing at Wichita Falls, Wichita County, Texas, have invented a certain new and useful Improvement in Pumps, of which the following is a full, clear, and exact description, such as will enable others skilled in the art to which it appertains to make and use the same.

My invention relates to an improvement in reciprocating pumps, and is particularly designed for use in pumping oil from deep wells.

It is an object of my invention to provide a pump wherein the reciprocating plunger may fit closely about the standing valve in such manner that no packing upon the plunger itself will be necessary, such packing as is required being placed upon the standing valve itself.

Another object is to provide a particularly efficient packing means adapted to fit upon the standing valve and to be automatically expanded by the operation of the plunger.

Another object is to provide means to prevent wear, as far as possible, upon the working parts, so that the pump will last for long periods of time without the necessity of removing the same.

Referring to the drawings herewith wherein the preferred embodiment of my invention is disclosed, Fig. 1 is a central longitudinal section through the standing valve and the lower end of the plunger used with my invention; Fig. 2 is a similar section on a smaller scale, showing the plunger in position relative to the standing valve; Fig. 3 is a plan view of one of the packing rings and Fig. 4 is a broken detail transversely of the packing ring showing it in position upon the plunger.

In carrying out my invention I use a pump barrel 1 which, because of the formation of my plunger, may be of ordinary tubing. No finished working barrel will be necessary because there is no contact between the plunger and the said barrel. The lower end of this tubing is connected within the upper end of a coupling 2. This coupling is connected at the opposite end to a strainer or perforated pipe 3 of the usual construction. The coupling 2 is reduced in diameter centrally thereof, and threaded at 4 to provide a seat for the tube 5 of the standing valve. This tube has its walls thickened toward the upper end thereof at 6, and terminates at the upper end in a reduced shank 7 which is threaded for attachment to a valve cage 8 of ordinary construction, which is threaded at 9 for attachment to a setting tool of the usual construction. Between the upper end of the shank 7 and the cage I provide a valve seat 10 for a ball valve 11.

The outer surface of the standing valve tube 6 is provided with a series of circumferential grooves 12 therein, to provide seats for packing rings 13. As shown particularly in Fig. 4 these grooves are of greater depth at the lower end thereof, and are tapered outwardly from the lower end toward the upper end.

The piston rings 13 which fit within these grooves are somewhat wedge-shaped in cross section, to fit within the grooves, the inner face being beveled upwardly. The said rings are somewhat narrower than are the grooves 12 in which they fit, so as to allow a limited play of the rings upon the tube, as the plunger barrel reciprocates. The upper outer edge of each of the rings is beveled at 14. Each of the rings 13 is split, as shown at 16, as is customary with piston rings, to allow expansion of the said rings in operation.

At the lower end of the standing valve tube 5 I preferably use a series of cups 15, of the construction ordinarily used on pump plungers. These cups are directed downwardly and spaced apart by means of sleeves 17. Between the lower sleeve 17 and the coupling 2 I may use a spacing sleeve 18 to secure the cups in position. These cups also bear against the inner face of the plunger and assist in maintaining a tight fit therewith.

The plunger which is used in connection with this standing valve is shown in Fig. 2. It has an upper head 19 with a valve cage 20 and ball valve 21 on the upper end thereof. The lower end of the head 19 is reduced in diameter and threaded at 22 for attachment to a downwardly extending tube 23 which fits closely around the outer periphery of the standing valve tube 6 over which it telescopes.

When this pump is operated in practice, the plunger is reciprocated in the usual manner, and because of the tight fit between the standing valve and the inner surface of the plunger barrel the oil is drawn upwardly through the standing valve on the upward stroke of the plunger, and the said oil is forced upwardly past the valve 21 in the plunger on the downward stroke. As the plunger moves upwardly the inner surface thereof contacts closely against the packing rings 13, which because of their resiliency, are forced outwardly against the said plunger. When the plunger moves upwardly, it will act to draw the rings in an upward direction, and, because of the outwardly inclined walls of the grooves 12, said rings will be forced outwardly so as to make a tight contact with the plunger. Thus, even when the rings have become worn by continued use, the operation of the plunger will automatically maintain a tight fit between the standing valve and the barrel 23 of the plunger, so that a suction will be constantly maintained for long periods. The cups will act in the usual manner to assist in maintaining the closure, and will act to prevent sand or other sediment from working up below the plunger so as to wear the standing valve.

The advantages of this type of construction lie in the fact that there will be no necessity of a working barrel and it will allow the use of tubing of ordinary construction throughout the length of the well. The use of the packing upon the standing valve does away with the usual construction of plunger, as no packing means thereon will be required. Fitting the packing upon the standing valve itself in the manner described acts to maintain the fit between the working parts much longer than is customary with the usual type of plunger.

Having thus described my invention, what I claim as new and desire to protect by Letters Patent is:

1. In a pump, a tubing, a standing valve coupling thereon, a standing valve tube projecting upwardly from said coupling in said tubing, a valve thereon, downwardly tapered grooves in said tube expansible packing rings fitting in said tapered grooves and a plunger telescoping over said standing valve tube.

2. In a pump, a tubing, a standing valve secured at the lower end thereof and projecting upwardly therein, a series of circumferential grooves in the outer surface of said standing valve, said grooves being tapered downwardly, packing rings slightly wedge-shaped in cross section to fit within said grooves, said rings being slightly narrower than the width of said grooves to allow movement of said rings therein, and a plunger adapted to telescope over said standing valve and fit closely thereon.

3. In a pump, a standing valve, comprising a cylindrical tubular member, a valve seat secured thereon, a valve in said seat, circumferential tapered grooves on the periphery of said member, expanding packing rings of less width than said grooves fitting therein, and a tubular plunger telescoping closely over said standing valve.

In testimony whereof, I hereunto affix my signature this 29th day of March, A. D. 1923.

FRANK J. MILLER.